United States Patent Office 3,464,996
Patented Sept. 2, 1969

---

3,464,996
6H - DIBENZO[c,g][1,2,5]THIADIAZOCINE - 5,5-DIOXIDES AND METHOD FOR THEIR PRODUCTION
John B. Wright, Kalamazoo, Mich., assignor to The Upjohn Company, Kalamazoo, Mich., a corporation of Delaware
No Drawing. Filed May 16, 1967, Ser. No. 638,768
Int. Cl. C07d 93/44; A61k 27/00; C09k 3/00
U.S. Cl. 260—293.4     17 Claims

ABSTRACT OF THE DISCLOSURE

6H - dibenzo[c,g][1,2,5]thiadiazocine - 5,5 - dioxides and a method of preparation which involves the condensation of a 2 - benzoylbenzenesulfonyl halide with an o - phenylene diamine and the subsequent cyclodehydration of the condensation product is disclosed.

These compounds are useful as starting materials for the preparation of bleaching agents, antiseptics, disinfectants, mothproofing agents, and/or herbicides; they are also useful as antidiabetic agents, antiallergic agents, central nervous system stimulants, coccidiostats, and ultraviolet light filters.

BACKGROUND OF THE INVENTION

The 6H - dibenzo[c,g][1,2,5]thiadiazocine - 5,5-dioxides disclosed and claimed herein have not been reported previously in the literature.

SUMMARY OF THE INVENTION

The compounds contemplated herein can be represented by the structural formula

I
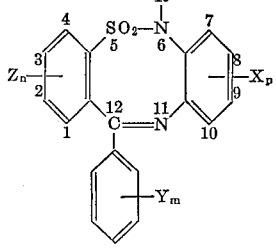

wherein X, Y, and Z can be halo, trifluoromethyl, alkyl, or alkoxy radicals and R can be hydrogen, alkyl, aralkyl, alkanoyl, alkylaminoalkyl, 1 - pyrrolidinylalkyl, alkyl-substituted 1 - pyrrolidinylalkyl, piperidinoalkyl, alkyl-substituted piperidinoalkyl, hexahydro - 1 - azepinylalkyl, or alkyl - substituted hexahydro - 1 - azepinylalkyl radical. The respective alkyl portions of the foregoing radicals contain no more than four carbon atoms, however, and $n$, $m$, and $p$ are integers having a value from 0 to 3, inclusive.

These compounds are useful as starting materials for the preparation of bleaching agents, antiseptics, disinfectants, mothproofing agents, and/or herbicides; they are also useful as antidiabetic agents, antiallergic agents, central nervous system stimulants, coccidiostats, and ultraviolet light filters.

DETAILED DESCRIPTION OF THE INVENTION

The compounds of the present invention, shown by Formula I, can be prepared by condensing, under reflux conditions, a 2 - benzoylbenzenesulfonyl halide represented by the structural formula II
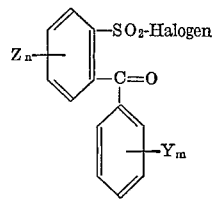

with an o-phenylene diamine represented by the structural formula

III
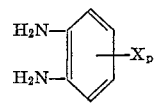

in a suitable aromatic solvent such as benzene, toluene, or the like, to produce a 2' - amino - 2 - benzoylbenzenesulfonanilide which can be shown by the formula IV
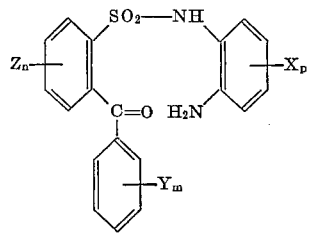

wherein Z, Y, X, $m$, $n$, and $p$ have the same meaning as above. The compounds represented by Formula IV are then cyclodehydrated in an acid medium and under reflux conditions to produce the corresponding 6H-dibenzo[c,g][1,2,5]thiadiazocine - 5,5 - dioxide. An aromatic solvent such as benzene, toluene, xylene, and the like, can be employed. Suitable acids are p-toluene sulfonic acid, concentrated sulfuric acid, phosphoric acid, aluminum trichloride, and the like.

In Formulas I, II, III, and IV illustrative alkyl radicals are methyl, ethyl, propyl, isopropyl, butyl, isobutyl, sec.-butyl, and tert.-butyl; illustrative aralkyl radicals are benzyl, phenylethyl, naphthylethyl, phenylbutyl, and the like; illustrative alkoxy radicals are methoxy, ethoxy, the propoxy, and the butoxy radicals; and illustrative alkanoyl radicals are formyl, acetyl, propionyl, butyryl, and the like.

Similarly, illustrative alkylaminoalkyl radicals are (methylamino)ethyl,
2-(diethylamino)ethyl,
3-(diethylamino)propyl,
4-(diethylamino)butyl,
4-(N-methyl-N-ethylamino)butyl,
2-(isopropylamino)ethyl,
2-(diisopropylamino)ethyl,
4-(tert.-butylamino)butyl, and the like;

illustrative alkyl-substituted 1-pyrolidinylalkyl radicals are 2-(2-methyl-1-pyrrolidinyl)ethyl,
3-(2-methyl-1-pyrrolidinyl)propyl,
2-(2,2,4-trimethyl-1-pyrrolidinyl)ethyl,
(2-methyl-1-pyrrolidinyl)methyl,
4-(2,4-diethyl-1-pyrrolidinyl)butyl,
4-(2-butyl-4-ethyl-1-pyrrolidinyl)butyl,
2-(3-tert.-butyl-1-pyrrolidinyl)ethyl, and the like;

illustrative alkyl-substituted piperidinoalkyl radicals are 2-(2-methylpiperidino)ethyl,
2-(3-methylpiperidino)ethyl, 2-(4-methylpiperidino)ethyl,
4-(3-isopropylpiperidino)butyl,
4-(4-tert.-butylpiperidino)butyl,
3-(2-methyl-5-ethylpiperidino)propyl,
2-(2,3,4-triethylpiperidino)ethyl,
4-(2,4,6-trimethylpiperidino)butyl, and the like;

and illustrative alkyl-substituted hexahydro-1 - azepinyl-alkyl radicals are 2-(2-ethyl-hexahydro-1-azepinyl)ethyl,
2-(4-tert.-butyl-hexahydro-1-azepinyl)ethyl,
4-(2,4-dimethylhexahydro-1-azepinyl)butyl,
3-(3,3-dimethylhexahydro-1-azepinyl)propyl,
2-(2,4,6-tri-n-propylhexahydro-1-azepinyl)ethyl, and the like.

Illustrative halo radicals contemplated herein are fluoro, chloro, bromo, and iodo.

The cyclodehydrated product produced in the afore-described manner is a 12-phenyl-6H-dibenzo[c,g][1,2,5]thiadiazocine-5,5-dioxide. An organic side chain can be placed on the nucleus of the foregoing compound in lieu of the hydrogen existing in the 6-position by reacting the cyclodehydrated product with an organic halide, the organic portion of which is the desired side chain. The addition of the side chain is usually carried out under reflux conditions in a suitable aqueous solvent and in the presence of an alkali metal hydroxide such as sodium hydroxide, potassium hydroxide, and the like.

Those of the foregoing compounds represented by Formula I which contain a basic side chain in the 6-position, i.e., the compounds where R is alkylaminoalkyl, 1-pyrrolidinylalkyl, alkyl-substituted 1-pyrrolidinylalkyl, piperidinoalkyl, alkyl-substituted piperidinoalkyl, hexahydro-1-azepinylalkyl, or alkyl-substituted hexahydro-1-azepinyl-alkyl radical, can also exist in the protonated or acid addition salt form. Stable acid addition salts can be formed with acids such as hydrochloric, hydrobromic, sulfuric, phosphoric, nitric, acetic, benzoic, salicycilc, glycolic, succinic, nicotinic, tartaric, maleic, malic, pamoic, methanesulfonic, picric, cyclohexane sulfamic, lactic, and the like.

The 2-benzoylbenzenesulfonyl halides (II) can be prepared in accordance with the procedure set forth in Remsen et al., Am. Chem. J. 17, 354 (1895). In addition, 2-aminobenzophenones (V) can be reacted with nitrous acid and then with sulfur dioxide and a cupric halide in an acid medium, e.g., hydrochloric acid, to produce the corresponding 2-benzoylbenzenesulfonyl halides as is illustrated below in the preparation of 2-benzoylbenzenesulfonyl chlorides:

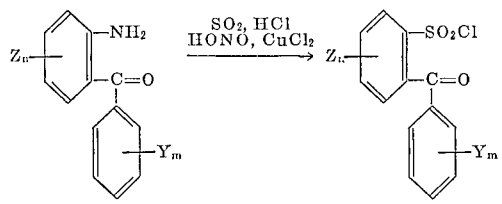

Thus, 2-benzoyl-6-bromobenzenesulfonyl chloride can be derived from 2-amino-3-bromobenzophenone, 2-benzoyl-5-bromobenzenesulfonyl chloride from
  2-amino-4-bromobenzophenone,
2-benzoyl-4'-bromobenzenesulfonyl chloride from
  2-amino-4'-bromobenzophenone,
2-benzoyl-4-bromobenzenesulfonyl chloride from
  2-amino-5-bromobenzophenone,
2-benzoyl-3-bromobenzenesulfonyl chloride from
  2-amino-6-bromobenzophenone,
2-benzoyl-4,6-dibromobenzenesulfonyl chloride from
  2-amino-3,5-dibromobenzophenone,
2-benzoyl-4-bromo-2'-fluorobenzenesulfonyl chloride
  from 2-amino-2'-fluoro-5-bromobenzophenone,
2-benzoyl-4-bromo-5-methoxybenzenesulfonyl chloride
  from 2-amino-4-methoxy-5-bromobenzophenone,
2-benzoyl-4-bromo-4'-methylbenzenesulfonyl chloride
  from 2-aimno-4'-methyl-5-bromobenzophenone,
2-benzoyl-2'-chlorobenzensulfonyl chloride from
  2-amino-2'-chlorobenzophenone,
2-benzoyl-6-chlorobenzenesulfonyl chloride from
  2-amino-3-chlorobenzophenone,
2-benzoyl-5-chlorobenzenesulfonyl chloride from
  2-amino-4-chlorobenzophenone,
2-benzoyl-4'-chlorobenzenesulfonyl chloride from
  2-amino-4'-chlorobenzophenone,
2-benzoyl-4-chlorobenzenesulfonyl chloride from
  2-amino-5-chlorobenzophenone,
2-benzoyl-3-chlorobenzenesulfonyl chloride from
  2-amino-6-chlorobenzophenone,
2-benzoyl-2',4-dichlorobenzenesulfonyl chloride from
  2-amino-2',5-dichlorobenzophenone,
2-benzoyl-4,6-dichlorobenzenesulfonyl chloride from
  2-amino-3,5-dichlorobenzophenone,
2-benzoyl-4,5-dichlorobenzenesulfonyl chloride from
  2-amino-4,5-dichlorobenzophenone,
2-benzoyl-4,4'-dichlorobenzenesulfonyl chloride from
  2-amino-4',5-dichlorobenzophenone,
2-benzoyl-4-chloro-2'-fluorobenzenesulfonyl chloride
  from 2-amino-2'-fluoro-5-chlorobenzophenone,
2-benzoyl-4-chloro3'-fluorobenzenesulfonyl chloride
  from 2-amino-3'-fluoro-5-chlorobenzophenone,
2-benzoyl-4-chloro-4'-fluorobenzenesulfonyl chloride
  from 2-amino-4'-fluoro-5-chlorobenzophenone,
2-benzoyl-4-methyl-2'-chlorobenzenesulfonyl chloride
  from 2-amino-2'-chloro-5-methylbenzophenone,
2-benzoyl-4'-methyl-3'-chlorobenzenesulfonyl chloride
  from 2-amino-3'-chloro-4'-methylbenzophenone.

In a like manner, 2-amino-2'-chloro-4,5-dimethylbenzophenone yields
  2-benzoyl-4,5-dimethyl-2'-chlorobenzenesulfonyl
  chloride,
2-amino-2',4'-dichloro-4,5-dimethylbenzophenone yields
  2-benzoyl-4,5-dimethyl-2',4'-dichlorobenzenesulfonyl
  chloride,
2-amino-2',5'-dichloro-4,5-dimethylbenzophenone yields
  2-benzoyl-4,5-dimethyl-2',5'-dichlorobenzenesulfonyl
  chloride,
2-amino-2',-methoxy-5-chlorobenzophenone yields
  2-benzoyl-4-chloro-2'-methoxybenzenesulfonyl
  chloride,
2-amino-4'-methoxy-5-chlorobenzophenone yields
  2-benzoyl-4-chloro-4'-methoxybenzenesulfonyl
  chloride,
2-amino-2'-methoxy-5-chloro-5'-methylbenzophenone
  yields 2-benzoyl-5'-methyl-4-chloro-2'-methoxy-
  benzenesulfonyl chloride,
2-amino-2'-fluorobenzophenone yields 2-benzoyl-2'-
  fluorobenzenesulfonyl chloride,
2-amino-4'-fluorobenzophenone yields 2-benzoyl-4'-
  fluorobenzenesulfonyl chloride,
2-amino-5'-fluorobenzophenone yields 2-benzoyl-4-
  fluorobenzenesulfonyl chloride,
2-amino-2'-fluoro-5-methylbenzophenone yields
  2-benzoyl-4-methyl-2'-fluorobenzenesulfonyl chloride,
2-amino-2'-trifluoromethylbenzophenone yields
  2-benzonyl-2'-trifluoromethylbenzenesulfonyl chloride,
2-amino-3-trifluoromethylbenzophenone yields
  2-benzoyl-6-trifluoromethylbenzenesulfonyl chloride,
2-amino-3'-trifluoromethylbenzophenone yields
  2-benzoyl-3'-trifluoromethylbenzenesulfonyl chloride,
2-amino-4-trifluoromethylbenzophenone yields 2-benzoyl-
  5-trifluoromethylbenzenesulfonyl chloride,
2-amino-2',5-di(trifluoromethyl)benzophenone yields
  2-benzoyl-2',4-di(trifluoromethyl)benzenesulfonyl
  chloride.

Similarly, 2 - amino - 2' - methoxybenzophenone produces 2 - benzoyl - 2' - methoxybenzenesulfonyl chloride, 2 - amino - 4 - methoxybenzophenone produces 2 - benzoyl - 5 - methoxybenzenesulfonyl chloride, 2 - amino-4' - methoxybenzophenone produces 2 - benzoyl - 4'-methoxybenzenesulfonyl chloride, 2 - amino - 5 - methoxybenzophenone produces 2 - benzoyl - 4 - methoxybenzenesulfonyl chloride, 2 - amino - 2',4 - dimethylbenzophenone produces 2 - benzoyl - 2',5 - dimethoxybenzenesulfonyl chloride, 2 - amino - 3,4 - dimethoxybenzophenone produces 2 - benzoyl - 5,6 - dimethoxybenzenesulfonyl chloride, 2 - amino - 3',4' - dimethoxybenzophenone produces 2 - benzoyl - 3',4' - dimethoxybenzenesulfonyl chloride, 2 - amino - 4,4',5 - trimethoxybenzophenone produces 2 - benzoyl - 4,4'5 - trimethoxybenzenesulfonyl chloride, 2 - amino - 2',5 - dimethyl - 3'-methoxybenzophenone produces 2 - benzoyl - 2',4 - dimethyl - 3' - methoxybenzenesulfonyl chloride, 2 - amino-2',3' - dimethyl - 4' - methoxybenzophenone produces 2 - benzoyl - 4' - methoxy - 2',3' - dimethylbenzenesulfonyl chloride, 2 - amino - 2',5' - dimethyl - 4' - methoxybenzophenone produces 2 - benzoyl - 2',5' - dimethyl - 4'-methoxybenzenesulfonyl chloride, 2 - amino - 2',5' - dimethyl - 5 - methoxybenzophenone produces 2 - benzoyl-4 - methoxy - 2',5' - dimethylbenzenesulfonyl chloride, 2 - amino - 2' - methyl - 5 - methoxybenzophenone produces 2 - benzoyl - 4 - methoxy - 2' - methylbenzenesulfonyl chloride, 2 - amino - 3,4 - dimethylbenzophenone produces 2 - benzoyl - 5,6 - dimethylbenzenesulfonyl chloride, 2 - amino - 3 - propyl - 5 - butylbenzophenone produces 2 - benzoyl - 4 - butyl - 6 - propylbenzenesulfonyl chloride, 2 - amino - 4 - ethyl - 4' - butylbenzophenone produces 2 - benzoyl - 4' - butyl - 5 - ethylbenzenesulfonyl chloride, etc.

Methods for preparation of 2-aminobenzophenones are taught by Lothrop et al., J. Am. Chem. Soc. 65, 363 (1943), and Sternbach et al., J. Org. Chem. 27, 3781 and 3788 (1962).

Initially a solution of 2-aminobenzophenone, acetic acid, and concentrated hydrochloric acid can be prepared and another solution of sodium nitrite in water. The former can then be added to the latter with stirring. To the resulting solution, one can add an aqueous solution of sulfur dioxide and cuprous chloride. After warming and stirring, the entire resulting admixture is poured on cracked ice and the 2-benzoylbenzenesulfonyl chloride recovered as a pale yellow solid which can be recrystallized from cyclohexane.

The o-phenylenediamines can be prepared by methods well known in the art. For example, compounds shown by Formula III can be prepared by nitrating a 1-alkyl-4-bromobenzene, treating the resulting 1-alkyl-4-bromo-3-nitrobenzene with alcoholic ammonia so as to produce the corresponding 1-alkyl-4-amino-3-nitrobenzene and then reducing the latter to obtain 4-alkyl-1,2-phenylenediamine. The reaction conditions are set forth in Karrer et al., Helv. Chim. Acta 17, 1516 (1934), showing the preparation of 4-ethyl-1,2-phenylenediamine from 4-bromo-1-ethylbenzene.

In addition, 4,5 - dialkyl - 1,2 - phenylenediamines can be prepared by nitrating the corresponding 1,2-dialkylbenzenes to yield the corresponding 3,4-dialkylaniline, converting the obtained aniline to the corresponding urethane, nitrating and then hydrolyzing the latter to produce the corresponding 4,5-dialkyl-2-nitroaniline, and then reducing the produced nitro compound to the 4,5-dialkyl - 1,2 - phenylenediamine. Typical reaction conditions for the above preparation are shown by Lamboy, J. Am. Chem. Soc. 71, 3756 (1949).

Illustrative o - phenylenediamines are 4 - methyl-1,2 - phenylenediamine, 4,5 - dimethyl - 1,2 - phenylenediamine, 4 - ethyl - 1,2 - phenylenediamine, 4,5 - diethyl-1,2 - phenylenediamine, 4 - propyl - 1,2 - phenylenediamine, 4,5 - dipropyl - 1,2 - phenylenediamine, 4,5 - diisopropyl - 1,2 - phenylenediamine, 4 - tert. - butyl - 1,2-phenylenediamine, 4,5 - dibutyl - 1,2 - phenylenediamine, and the like.

The overall synthetic route for the preparation of the compounds of this invention is schematically illustrated below in the preparation of 2-chloro-6-methyl-12-phenyl-6H - dibenzo [c,g][1,2,5]thiadiazocine - 5,5 - dioxide:

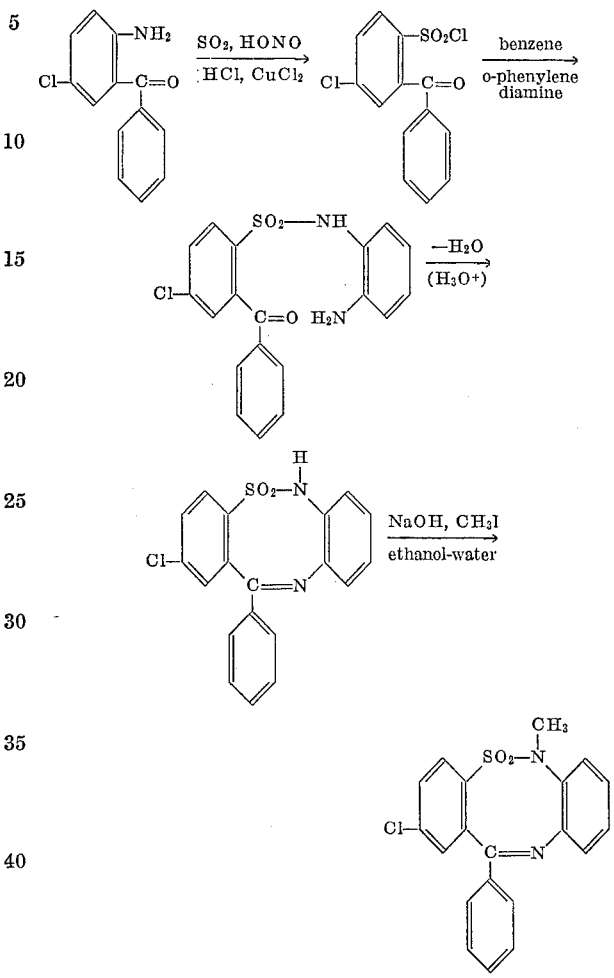

Compounds represented by Formula I where R is hydrogen can be reacted with chlorine to produce active chlorine compounds in which the hydrogen is replaced by chlorine. These active chlorine compounds are useful as bleaching agents, antiseptics, and disinfectants similar to the compounds disclosed in U.S. Patent 3,115,495.

In addition, compounds of the type shown by Formula I where R is alkyl, aralkyl, alkanoyl, or hydrogen are also useful as antidiabetic agents in mammals.

Compounds of Formula I where R is alkylaminoalkyl are useful as coccidiostats in fowl.

The acid addition salts of compounds represented by Formula I and where R is a heterocyclic aminoalkyl group, i.e., 1 - pyrrolidinylalkyl, alkyl - substituted 1-pyrrolidinylalkyl, piperidinoalkyl, alkyl - substituted piperidinoalkyl, 1 - azepinylalkyl or alkyl - substituted 1 - azepinylalkyl are useful as central nervous system stimulants in mammals and as antiallergic agents.

Compounds represented by Formula I where R is a basic side chain form salts with fluosilicic acid. Such salts are useful as mothproofing agents in accordance with the teachings of U.S. Patent 1,915,334 and U.S. Patent 2,075,359. These compounds also form salts with thiocyanic acid which, in turn, condense with formaldehyde and produce resinous materials useful as pickling inhibitors according to U.S. Patent 2,525,320 and U.S. Patent 2,606,155. Similarly, compounds of Formula I where R is a basic side chain form salts with trichloroacetic acid which are useful as herbicides against Johnson grass, yellow foxtail, green foxtail, Bermuda grass, quack grass, and the like.

In addition, all compounds of the type shown by Formula I can be reduced catalytically with hydrogen and using platinum or Raney nickel as a catalyst so as to produce 11,12-dihydro derivatives. The catalytic reduction produces an amino nitrogen at the 11-position which can be reacted with fluosilicic acid, thiocyanic acid, or trichloroacetic acid as above.

Compounds of the type shown by Formula I have been found to absorb ultraviolet light in the 280 to 300 m$\mu$ range and thus are useful as filters for ultraviolet light of the foregoing wave lengths.

Compounds of the type shown by Formula IV are useful as intermediates for the preparation of compounds of Formula I as disclosed herein.

This invention is further illustrated by the following examples:

EXAMPLE I.—PREPARATION OF 2′-AMINO-2-BENZOYL-4-CHLOROBENZENESULFOANILIDE

A mixture of 2-benzoyl-4-chlorobenzenesulfonyl chloride (about 15.75 grams, 0.05 mole), o-phenylenediamine (about 27 grams, 0.25 mole), and benzene (about 300 milliliters), was refluxed for about two hours, cooled and filtered. The resulting filter cake was taken up in benzene and extracted with a 1 weight percent NaOH solution (about 500 milliliters total). The basic extract was then acidified with acetic acid.

A precipitate was formed as a result and was recovered by means of filtration. The resulting filter cake was washed with water. After washing, about 19 grams of a tan solid melting at 168° to 171° C. was obtained. The solid was identified as 2′-amino-2-benzoyl-4-chlorobenzenesulfoanilide obtained in about 98 percent yield.

*Analysis.*—Calculated for $C_{19}H_{15}ClN_2O_3S$: C, 58.99; H, 3.91; Cl, 9.16; N, 7.24; S, 8.29. Found: C, 59.26; H, 3.93; Cl, 9.21; N, 7.45; S, 8.50.

EXAMPLE II.—PREPARATION OF 2-CHLORO-12-PHENYL - 6H - DIBENZO[c,g][1,2,5]THIADIAZOCINE-5,5-DIOXIDE

2′ - amino - 2 - benzoyl - 4 - chlorobenzenesulfoanilide (about 19.35 grams, 0.05 mole), p-toluenesulfonic acid (about 2 grams), and toluene (about 150 milliliters) were admixed and refluxed under a water trap for about 20 hours. The theoretical amount of water for the dehydration of the 2′-amino-2-benzoyl-4-chlorobenzenesulfoanilide (about 0.9 milliliter) was collected in the water trap.

The mixture obtained was then extracted with a weak ammonium hydroxide solution (weight ratio of $NH_3$ to $H_2O$ about 1:20), to remove any remaining p-toluenesulfonic acid from the mixture, and thereafter with water.

The remaining toluene layer was dried over $MgSO_4$ and concentrated. The thus obtained concentrate was dissolved in anhydrous diethyl ether and further treated with ethereal-HCl to remove any remaining starting material. The resulting solution was filtered and the obtained ethereal mother liquors were concentrated. About 13.8 grams of a brown solid melting at 173.5° to 177.5° C. was obtained. Recrystallization from ethanol yielded a solid in the form of tan prisms melting at 180° to 181° C. The solid was identified as 2-chloro-12-phenyl-6H-dibenzo[c,g][1,2,5]thiadiazocine - 5,5 - dioxide, obtained in about 75 percent yield.

*Analysis.*—Calculated for $C_{19}H_{13}ClN_2O_2S$: C, 61.87; H, 3.55; Cl, 9.61; N, 7.60; S, 8.69. Found: C, 61.55; H, 3.89; Cl, 9.73; N, 7.34; S, 8.73.

By means of a mass spectrogram the molecular weight (parent *m/e* peak) of the prepared compound was found to be 368.

EXAMPLE III.—PREPARATION OF 2-CHLORO-6-METHYL - 12 - PHENYL - 6H - DIBENZO[c,g][1,2,5]THIADIAZOCINE-5,5-DIOXIDE

2 - chloro - 12 - phenyl - 6H - dibenzo[c,g,][1,2,5]thiadiazocine-5,5-dioxide (about 3.68 grams, 0.01 mole) was dissolved in a mixture of 5 weight percent aqueous NaOH solution (about 10 milliliters), water (about 20 milliliters), and ethanol (about 30 milliliters) contained in a suitable flask. Thereafter, the resulting solution was cooled in an ice bath to a temperature below about 10° C., and methyl iodide (about 2 milliliters) was added to the cooled solution.

The flask was then fitted with a condenser and the contents thereof maintained at about room temperature and stirred for about 5 hours. Subsequently, an additional amount of methyl iodide (about 2 milliliters) was added to the flask. Thereafter, the resulting mixture was allowed to stand at about room temperature for about 48 hours.

Then the mixture contained in the flask was diluted with an equal amount of water. A precipitate resulted. The precipitate was recovered by means of filtration and then washed well with water. About 3.61 grams of a crystalline solid having a melting point of 192° to 195° C. was obtained. Recrystallization from benzene raised the melting point to 195° to 197° C. The solid was identified as 2 - chloro - 6 - methyl - 12 - phenyl - 6H - dibenzo[c,g][1,2,5]thiadiazocine-5,5-dioxide, obtained in about 94 percent yield.

*Analysis.*—Calculated for $C_{20}H_{15}ClN_2O_2S$: C, 62.74; H, 3.95; Cl, 9.26; N, 7.32; S, 8.37. Found: C, 63.50; H, 4.49; Cl, 9.16; N, 7.07; S, 9.98.

EXAMPLE IV.—PREPARATION OF 6-BENZYL-2-CHLORO - 12 - PHENYL - 6H - DIBENZO[c,g][1,2,5]THIADIAZOCINE-5,5-DIOXIDE

2 - chloro - 12 - phenyl - 6H - dibenzo[c,g][1,2,5]thiadiazocine-5,5-dioxide (about 3.68 grams, 0.01 mole) was dissolved in a mixture of 5 weight percent aqueous NaOH solution (about 10 milliliters), water (about 20 milliliters), and ethanol (about 30 milliliters) contained in a suitable flask. Thereafter, benzyl chloride (about 1.27 grams, 0.01 mole) was added to the resulting solution, chilled to a temperature of about 8°–10° C.

After the benzyl chloride addition, the contents of the flask was stirred for about 18 hours at about room temperature and then diluted with water (about 100 milliliters). A precipitate resulted. About 2.95 grams of the precipitate in the form of yellow crystals melting at 192° to 196° C. was recovered by means of filtration. Two recrystallizations from 95 weight percent ethanol yielded yellow, prismatic crystals melting at 198° to 199° C. The crystals were identified as 6-benzyl-2-chloro-12-phenyl-6H-dibenzo[c,g][1,2,5]thiadiazocine-5,5-dioxide, obtained in about 64 percent yield.

*Analysis.*—Calculated for $C_{26}H_{19}ClN_2O_2S$: C, 68.04; H, 4.17; Cl, 7.72; N, 6.11; S, 6.99. Found: C, 68.20; H, 4.36; Cl, 7.86; N, 5.90; S, 6.95.

EXAMPLE V.—PREPARATION OF 2′-AMINO-2-BENZOYL-BENZENESULFONANILIDE

A mixture of 2-benzoylbenzenesulfonyl chloride (about 14 grams, 0.05 mole), o-phenylenediamine (about 27 grams, 0.025 mole), and benzene (about 300 milliliters) was placed in a suitable reaction vessel, refluxed with stirring for about two hours, and thereafter cooled and filtered.

The resulting filter cake was partitioned between benzene and a 1 weight percent aqueous solution of sodium hydroxide. The resulting aqueous layer was separated, and the benzene layer extracted with an additional amount of 1 weight percent aqueous solution of sodium hydroxide.

Both aqueous layers obtained in the aforedescribed manner were then combined and acidified with acetic acid while being cooled and stirred. A precipitate was formed, recovered by means of filtration, and washed with water. Upon recrystallization of the precipitate from ethyl acetate about 11.3 grams of yellow prisms melting at 188° to 189° C. were produced. The yellow prisms were identified as 2′-amino-2-benzoylbenzenesulfonanilide, obtained in about 64 percent yield.

*Analysis.*—Calculated for $C_{19}H_{16}N_2O_3S$: C, 64.76; H, 4.58; N, 7.95; S, 9.10. Found: C, 64.86; H, 4.31; N, 7.80; S, 9.34.

EXAMPLE VI.—PREPARATION OF 12-PHENYL-6H-DIBENZO[c,g][1,2,5]THIADIAZOCINE - 5,5 - DIOXIDE

A solution of 2'-amino-2-benzoylbenzenesulfonanilide (8.8 grams, 0.025 mole) in dry toluene (about 100 milliliters) was prepared and refluxed for about one-half hour at which time p-toluenesulfonic acid (about 0.25 grams) was added. Thereafter, the resulting admixture was refluxed under a water trap for about eight hours. During this time period, the theoretical amount of water for the cyclization of the 2'-amino-2-benzoylbenzenesulfonanilide was collected.

The thus-obtained mixture of reactants and reaction products was filtered, the filtrate washed with a dilute aqueous ammonium hydroxide solution (weight ratio of $NH_3$ to $H_2O=1:20$) and then water. After washing with water, the filtrate was dried over $MgSO_4$ and concentrated by evaporation. The remaining solid residue was recrystallized from ethanol as yellow prismatic crystals melting at 165.5° to 170° C. About 7.05 grams of crystals were produced. Two additional recrystallizations from 95 weight percent ethanol gave yellow prismatic crystals melting at 169° to 170.5° C. The crystals were identified as 12 - phenyl-6H-dibenzo[c,g][1,2,5]thiadiazocine-5,5-dioxide, obtained in about 84 percent yield.

*Analysis.*—Calculated for $C_{19}H_{14}N_2O_2S$: C, 68.24; H, 4.22; N, 8.38; S, 9.59. Found: C, 68.07; H, 4.39; N, 8.21; S, 9.44.

EXAMPLE VII. — PREPARATION OF 6-ACETYL-12 - PHENYL - 6H-DIBENZO[c,g][1,2,5]THIADIAZOCINE-5,5-DIOXIDE

A solution was prepared from 12-phenyl-6H-dibenzo[c,g][1,2,5]thiadiazocine-5,5-dioxide (about 3.34 grams, 0.01 mole), acetyl chloride (about 10 milliliters), and chloroform (about 100 mililiters), refluxed for about one hour, and then concentrated by evaporation to dryness. The remaining solid residue was recrystallized from isopropanol as a brown solid which was again recrystallized from isopropanol in the form of yellow crystals (about 1.45 grams) melting at 87° C. (dec.). Two additional recrystallizations from isopropanol produced yellow crystals melting at 125° C. (dec.). The crystals were identified as 6 - acetyl - 12 - phenyl-6H-dibenzo[c,g][1,2,5]thiadiazocine-5,5-dioxide.

*Analysis.*—Calculated for $C_{21}H_{16}N_2O_3S$: C, 67.00; H, 4.29; S, 8.52. Found: C, 66.69; H, 4.49; S, 8.36.

EXAMPLE VIII.—PREPARATION OF 2-CHLORO-6-[2 - (DIETHYLAMINO)ETHYL] - 12 - PHENYL-6H - DIBENZO[c,g][1,2,5]THIADIAZOCINE - 5,5-DIOXIDE

A solution was prepared from 2-chloro-12-phenyl-6H-dibenzo[c,g][1,2,5]thiadiazocine-5,5-dioxide (about 18.8 grams, 0.05 mole), a 2.5 weight percent aqueous solution of sodium hydroxide (about 100 milliliters), and 95 weight percent ethanol (about 140 milliliters). The solution was chilled to about 7° C. and diethylaminoethyl chloride (about 10.15 grams, 0.075 mole) was added thereto.

The resulting solution was stirred at room temperature for about 7 hours, left standing for about 18 hours, and then diluted with water (about 250 milliliters) and filtered.

Upon filtration, a yellow solid melting at 133° to 136° C. was recovered. The yellow solid was recrystallized from 95 weight percent ethanol and about 19.17 grams of yellow platelets melting at 136.5° to 138° C. were obtained. A second recrystallization from 95 weight percent ethanol yielded yellow platelets melting at 137° to 138° C. The yellow platelets were identified as 2-chloro-6-[2(diethylamino)ethyl] - 12 - phenyl-6H-dibenzo[c,g][1,2,5] thiadiazocine-5,5-dioxide, obtained in 82 percent yield.

*Analysis.*—Calculated for $C_{25}H_{26}ClN_3O_2S$: C, 64.16; H, 5.00; Cl, 7.57; N, 8.98; S, 6.85. Found: C, 63.71; H, 5.33; Cl, 7.67; N, 8.82; S, 6.76.

The foregoing compound is also useful as an antiallergy agent.

EXAMPLE IX.—PREPARATION OF 2-CHLORO-6-[2(DIISOPROPYLAMINO)ETHYL] - 12 - PHENYL-6H - DIBENZO[c.g][1,2,5]THIADIAZOCINE - 5,5-DIOXIDE

In a suitable reaction vessel was placed a mixture of 2-chloro-12 - phenyl - 6H -dibenzo[c,g][1,2,5]thiadiazocine-5,5-dioxide (about 36.8 grams, 0.1 mole), sodium hydroxide (about 16 grams, 0.4 mole), water (about 400 milliliters), ethanol (about 400 milliliters), and diisopropylaminoethyl chloride hydrochloride (about 40 grams, 0.2 mole). The mixture was stirred at about room temperature for about 48 hours, filtered, and the resulting filter cake washed with water.

The thus obtained solid was recrystallized from 95 weight percent ethanol and about 40.1 grams of tan, prismatic crystals melting at about 154° to 155° C. were produced. Further recrystallization did not elevate the melting point. The crystals were identified as 2-chloro-6-[2(diisopropylamino)ethyl] - 12 - phenyl-6H-dibenzo[c,g][1,2,5]thiadiazocine-5,5-dioxide, obtained in about 81 percent yield.

*Analysis.*—Calculated for $C_{27}H_{30}ClN_3O_2S$: C, 65.37; H, 6.10; Cl, 7.15; N, 8.47; S, 6.46. Found: C, 65.08; H, 6.14; Cl, 7.11; N, 8.41; S, 6.70.

EXAMPLE X.—PREPARATION OF 2-CHLORO-6-[2-(2-METHYL - 1 - PYRROLIDINYL)ETHYL]-12-PHENYL - 6H - DIBENZO[c,g][1,2,5]THIADIAZOCINE-5,5-DIOXIDE 2-chloro-12-phenyl - 6H-dibenzo[c.g][1,2,5]thiazocine-5,5-dioxide (about 36.8 grams, 0.1 mole) and sodium hydroxide (about 16 grams, 0.4 mole), were dissolved in water (about 400 milliliters) and ethanol (about 400 milliliters). The resulting solution was chilled to about 5° C. To the chilled solution was added 2-(2-methyl - 1 - pyrrolidinyl)ethyl chloride hydrochloride (about 36.82 grams, 0.2 mole) dissolved in water (about 50 milliliters) and the combined solution was stirred at about room temperature for about 16 hours, and then diluted with water (about 500 milliliters) and filtered.

The obtained filter cake was washed with water and about 48.2 grams of a tan solid melting at 169° to 172° C. was obtained. The tan solid was recrystallized from 95 weight percent ethanol and treated with charcoal. About 33.95 grams of yellow-tinted, prismatic crystals were obtained, having a melting point of 173° to 174° C. A second recrystallization from 95 weight percent ethanol did not elevate the melting point. The crystals were identified as 2-chloro-6-[2-(2-methyl-1-pyrrolidinyl) ethyl]-1-phenyl - 6H - dibenzo[c.g][1,2,5]thiadiazocine-5,5-dioxide, obtained in about 71 percent yield.

*Analysis.*—Calculated for $C_{26}H_{26}ClN_3O_2S$: C, 65.06; H, 5.46; Cl, 7.39; N, 8.75; S, 6.68. Found: C, 65.25; H, 5.62; Cl, 7.48; N, 8.83; S, 7.03.

EXAMPLE XI.—PREPARATION OF 2-CHLORO-12-PHENYL-6-[2-(2,2,4 - TRIMETHYL - 1-PYRROLIDINYL)ETHYL] - 6H - DIBENZO[c,g][1,2,5]THIADIAZOCINE-5,5-DIOXIDE 2-chloro-1-phenyl - 6H - dibenzo[c,g][1,2,5]thiadiazocine-5,5-dioxide (about 36.8 grams, 0.1 mole) and sodium hydroxide (about 16 grams, 0.4 mole) were dissolved in ethanol (about 400 milliliters) and water (about 100 milliliters). To the resulting solution was added, with stirring, a 50 weight percent solution of 2-(2,2,4-trimethyl-1-pyrrolidinyl)ethyl chloride in toluene (about 70 milliliters, 0.2 mole). The combined solution was stirred at about room temperature for about 16 hours and then filtered.

The obtained filter cake was washed well with water, and about 46.4 grams of a tan solid melting at 172° to 173° C. was obtained. Two recrystallizations from ethyl acetate yielded tan platelets melting at 173.5° to 175° C. The tan platelets were identified as 2-chloro-12 - phenyl - 6 - [2,(2,2,4 - trimethyl - 1 - pyrrolidinyl)ethyl] - 6H - dibenzo[c,g][1,2,5]thiadiacozine - 5,5 - dioxide, obtained in about 91 percent yield.

*Analysis.*—Calculated for $C_{28}H_{30}ClN_3O_2S$: C, 66.19; H, 5.95; Cl, 6.98; N, 8.27; S, 6.31. Found: 66.50; H, 6.22; Cl, 6.95; N, 8.51; S, 6.70.

The corresponding hydrochloride of the foregoing compound was prepared by adding an excess of etheral-HCl to the compound, i.e., the free base, dissolved in benzene. The resulting precipitate was washed with diethyl ether, triturated with boiling ethyl acetate, and thereafter recrystallized from isopropanol. Yellow, prismatic crystals melting at 261° to 263° C. were obtained. The crystals were identified as 2-chloro-12-phenyl-6-(2,2,4-trimethyl-1-pyrrolidinyl)ethyl - 6H - dibenzo[c,g][1,2,5]thiadiazocine-5,5-dioxide hydrochloride.

*Analysis.*—Calculated for $C_{28}H_{30}ClN_3O_2S \cdot HCl$: C, 61.76; H, 5.74; Cl, 13.02; N, 7.72; S, 5.89. Found: C, 61.42; H, 5.88; Cl, 13.18; N, 7.54; S, 6.03.

EXAMPLE XII.—PREPARATION OF 2-CHLORO-12-PHENYL-6 - (2 - PIPERIDINOETHYL)-6H-DIBENZO[c,g][1,2,5]THIADIAZOCINE-5,5-DIOXIDE 2-chloro-12 - phenyl - 6H - dibenzo[c,g][1,2,5]thiadiazocine-5,5-dioxide (about 36.8 grams, 0.1 mole) and sodium hydroxide (about 16 grams, 0.4 mole) were dissolved in ethanol (about 400 milliliters) and water (about 400 milliliters). To the resulting solution was added, at about room temperature and with stirring, a solution of N-(β-chloroethyl)piperidine hydrochloride (about 31.9 grams, 0.2 mole) in water (about 50 milliliters).

The thus produced admixture was stirred for about 16 hours, filtered, and the obtained filter cake washed with water. About 43.7 grams of a tan solid melting at 169° to 170.5° C. was recovered. Recrystallization from 95 weight percent ethanol gave tan prisms possessing the same melting point. The produced compound was identified as 2-chloro-12-phenyl-6-(2-piperidinoethyl)-6H-dibenzo-[c.g][1,2,5]thiadiazocine-5,5 - dioxide, obtained in about 91 percent yield.

*Analysis.*—Calculated for $C_{26}H_{26}ClN_3O_2S$: C, 65.06; H, 5.46; Cl, 7.39; N, 8.75; S, 6.68. Found: C, 64.91; H, 5.62; Cl, 7.30; N, 8.59; S, 7.03.

The corresponding hydrochloride of the foregoing compound was prepared by adding an excess of ethereal-HCl to the compound, i.e., to the free base, dissolved in benzene. The resulting precipitate was washed with diethyl ether, triturated with boiling ethyl acetate, and thereafter recrystallized from isopropanol. About quantitative yield of a tan solid melting at 280° C. (dec.) was obtained. Recrystallization from isopropanol did not change the melting point. The tan solid was identified as 2-chloro-12-phenyl-6-(2 - piperidinoethyl)-6H-dibenzo-[c,g][1,2,5]thiadiazocine-5,5-dioxide hydrochloride.

*Analysis.*—Calculated for $C_{26}H_{26}ClN_3O_2S \cdot HCl$: C, 60.46; H, 5.27; Cl, 13.73; N, 8.14; S, 6.21. Found: C, 60.62; H, 5.25; Cl, 13.48; N, 7.80; S, 6.24.

EXAMPLE XIII.—PREPARATION OF 2-CHLORO-6-[2-(HEXAHYDRO - 1H-AZEPIN-1-YL)ETHYL]-12-PHENYL - 6H - DIBENZO[c,g][1,2,5]THIADIAZOCINE-5,5-DIOXIDE 2-chloro - 12-phenyl - 6H - dibenzo[c,g][1,2,5]thiadiazocine-5,5-dioxide (about 36.8 grams, 0.1 mole) and sodium hydroxide (about 16 grams, 0.4 mole) were dissolved in ethanol (about 400 milliliters) and water (about 100 milliliters). The resulting solution was combined with a solution of N - hexamethyleneiminoethyl chloride (about 50.74 grams, 0.2 mole) in a gram-equivalent of toluene, stirred at room temperature for about 8 hours, thereafter diluted with water (about 500 milliliters), and filtered. The recovered filter cake was washed well with water. About 27.4 grams of a tan solid melting at 152.5° to 154.5° C. was obtained. After about two recrystallizations from 95 weight percent ethanol, a constant melting point of 155° to 156.5° C. for the produced compound was achieved.

The produced compound was identified as 2-chloro-6-[2-(hexahydro - 1H - azepin-1-yl)ethyl] - 12-phenyl-6H-dibenzo[c,g][1,2,5]thiadiazocine - 5,5-dioxide, obtained in about 55.5 percent yield.

*Analysis.*—Calculated for $C_{27}H_{28}ClN_3O_2S$: C, 65.64; H, 5.71; Cl, 7.18; N, 8.51; S, 6.49. Found: C, 65.65; H, 6.04; Cl, 7.16; N, 8.59; S, 6.90.

The corresponding hydrochloride of the foregoing compound was prepared in a manner analogous to Example XII. Recrystallization from isopropanol produced crystals in the form of pale green needles melting at 200° to 262° C. The crystals were identified as 2-chloro-6-[2-(hexahydro - 1H - azepin-1-yl)ethyl] - 12-phenyl-6H-dibenzo[c,g][1,2,5]thiadiazocine - 5,5 - dioxide hydrochloride.

*Analysis.*—Calculated for $C_{27}H_{28}ClN_3O_2S \cdot HCl$: C, 61.13; H, 5.51; Cl, 13.37; N, 7.92; S, 6.04. Found: C, 61.00; H, 5.84; Cl, 13.07; N, 7.65; S, 6.11.

EXAMPLE XIV.—PREPARATION OF 6-[2-(TERT.-BUTYLAMINO)ETHYL] - 2-CHLORO - 12-PHENYL - 6H - DIBENZO[c,g][1,2,5]THIADIAZOCINE-5,5-DIOXIDE HYDROCHLORIDE 2-chloro-12-phenyl - 6H - dibenzo[c,g][1,2,5]thiadiazocine-5,5-dioxide (about 36.8 grams, 0.1 mole) and sodium hydroxide (about 16 grams, 0.4 mole) were dissolved in ethanol (about 400 milliliters) and water (about 400 milliliters). The resulting solution was combined with a solution of tertiary butylaminoethyl chloride hydrochloride (about 34.40 grams, 0.15 mole) in water (about 50 milliliters), was stirred at room temperature for about 16 hours, and thereafter diluted with water (about 400 milliliters).

The resulting admixture was then extracted with methylene chloride and the obtained extracts dried over $MgSO_4$ and concentrated by evaporation. The produced residual gum was converted to a hydrochloride in a manner analogous to that set forth in Example XII. A crystalline solid was obtained and was recrystallized from methanol-ethanol (weight ratio about 3:1, respectively). About 18.6 grams of crystals in the form of green prisms was obtained, melting at 300° C. (dec.). A further recrystallization from methanol yielded pale green prismatic crystals melting at 304° C. (dec.). The produced compound was identified as 6-[2 - (tert.-butyl - amino) ethyl] - 2-chloro - 12-phenyl - 6H - dibenzo[c,g][1,2,5] thiadiazocine-5,5-dioxide hydrochloride, obtained in about 37 percent yield.

*Analysis.*—Calculated for $C_{25}H_{26}ClN_3O_2S \cdot HCl$: C, 59.52; H, 5.40; Cl, 14.06; N, 8.33; S, 6.36. Found: C, 59.28; H, 5.37; Cl, 13.92; N, 8.14; S, 6.29.

EXAMPLE XV.—PREPARATION OF 2-CHLORO-6-[3-(DIMETHYLAMINO)PROPYL] - 12-PHENYL-6H - DIBENZO[c,g][1,2,5]THIADIAZOCINE - 5,5-DIOXIDE

A solution of 2-chloro - 12-phenyl - 6H - dibenzo[c,g][1,2,5]thiadiazocine-5,5-dioxide (about 36.8 grams, 0.1 mole), sodium hydroxide (about 8 grams, 0.2 mole), ethanol (about 400 milliliters), water (about 400 milliliters), and dimethylaminopropyl chloride (about 24.32 grams, 0.2 mole) was stirred and refluxed for about 24 hours, poured into about 500 milliliters of ice water, and extracted with diethyl ether.

The ether extracts were dried over MgSO₄ and concentrated by evaporation. The obtained residue was dissolved in absolute ethanol and precipitated by adding diethyl ether until the solution became turbid and then cooling. The precipitate was recovered and twice recrystallized from isopropanol. About 2 grams of tan crystals melting at 127° to 135° C. were obtained. The crystals were identified as 2-chloro-6-[3-(dimethylamino)propyl] - 12-phenyl - 6H - dibenzo[c,g][1,2,5]thiadiazocine-5,5-dioxide.

*Analysis.*—Calculated for $C_{24}H_{24}ClN_3O_2S$: C, 63.50; H, 5.33; Cl, 7.81; N, 9.26; S, 7.06. Found: C, 63.55; H, 5.57; Cl, 7.73; N, 9.48; S, 6.87.

EXAMPLE XVI.—PREPARATION OF 2-CHLORO-12-PHENYL - 6-(3-PIPERIDINO - PROPYL) - 6H-DIBENZO[c,g][1,2,5]THIADIAZOCINE - 5,5 - DIOXIDE

A solution of 2-chloro-12-phenyl - 6H - dibenzo[c,g][1,2,5]thiadiazocine-5,5-dioxide (about 36.8 grams, 0.1 mole), sodium hydroxide (about 8 grams, 0.2 mole), ethanol (about 400 milliliters), water (about 100 milliliters), and N-gamma-chloropropylpiperidine (about 50.7 grams, 0.2 mole) dissolved in toluene (about 18.4 grams) was stirred and refluxed for about 24 hours, poured into ice water, and extracted with diethyl ether.

The ether extracts were dried over MgSO₄ and concentrated by evaporation. The obtained oily residue was crystallized from isopropanol. About 27.65 grams of crystals in the form of tan prisms melting at 57° to 50° C. was obtained. Two recrystallizations from isopropanol yielded tan, prismatic crystals melting constantly at 63° to 65° C. The crystals were identified as the isopropanol solvate of 2-chloro - 12-phenyl - 6-(3-piperidinopropyl)-6H - dibenzo[c,g][1,2,5]thiadiazocine-5,5-dioxide.

The corresponding hydrochloride of the foregoing compound was prepared in a manner analogous to Example XII. Recrystallization from isopropanol produced about 23.25 grams of colorless, prismatic crystals melting at 252° to 254° C. Additional recrystallization from isopropanol did not elevate the melting point. The crystals were identified as 2-chloro - 12-phenyl-6 - (3-piperidinopropyl) - 6H - dibenzo[c,g][1,2,5]thiadiazocine - 5,5-dioxide hydrochloride.

*Analysis.*—Calculated for $C_{27}H_{28}ClN_3O_2S \cdot HCl$: C, 61.13; H, 5.51; Cl, 13.37; N, 7.72; S, 6.04. Found: C, 61.31; H, 5.38; Cl, 13.35; N, 7.72; S, 5.98.

I claim:
1. A 6H-dibenzo[c,g][1,2,5]thiadiazocine-5,5-dioxide represented by the formula

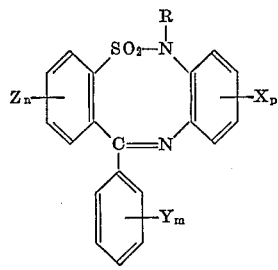

wherein X, Y, and Z are members of the group consisting of halo, trifluoromethyl, alkyl, and alkoxy; R is a member of the group consisting of hydrogen, alkyl, phenylalkyl, naphthylalkyl, alkanoyl, alkylaminoalkyl, 1-pyrrolidinylalkyl, alkyl-substituted 1-pyrrolidinylalkyl, piperidinoalkyl, alkyl-substituted piperidinoalkyl, hexahydro-1-azepinylalkyl, and alkyl-substituted hexahydro-1-azepinylalkyl; and *m*, *n*, and *p* are integers having a value from 0 to 3, inclusive, with the proviso that the alkyl portions of the foregoing radicals contain no more than four carbon atoms; and the corresponding acid addition salts thereof.

2. The dibenzo[c,g][1,2,5]thiadiazocine-5,5-dioxide in accordance with claim 1 wherein R is benzyl, Z is chloro situated in the 2-position, *m* and *p* have a value of zero, and *n* has a value of 1.

3. The dibenzo[c,g][1,2,5]thiadiazocine-5,5-dioxide in accordance with claim 1 wherein R is hydrogen, Z is chloro situated in the 2-position, *m* and *p* have a value of zero, and *n* has a value of 1.

4. The dibenzo[c,g][1,2,5]thiadiazocine-5,5-dioxide in accordance with claim 1 wherein R is methyl, Z is chloro situated in the 2-position, *m* and *p* have a value of zero, and *n* has a value of 1.

5. The dibenzo[c,g][1,2,5]thiadiazocine-5,5-dioxide in accordance with claim 1 wherein R is hydrogen, and *m*, *n*, and *p* have a value of zero.

6. The dibenzo[c,g][1,2,5]thiadiazocine-5,5-dioxide in accordance with claim 1 wherein R is acetyl, and *m*, *n*, and *p* have a value of zero.

7. The dibenzo[c,g][1,2,5]thiadiazocine-5,5-dioxide in accordance with claim 1 wherein R is 2-(diethylamino)ethyl, Z is chloro situated in the 2-position, *m* and *p* have a value of zero, and *n* has a value of 1.

8. The dibenzo[c,g][1,2,5]thiadiazocine-5,5-dioxide in accordance with claim 1 wherein R is 2-(tert.-butylamino)ethyl, Z is chloro situated in the 2-position, *m* and *p* have a value of zero, and *n* has a value of 1.

9. The dibenzo[c,g][1,2,5]thiadiazocine-5,5-dioxide in accordance with claim 1 wherein R is 2-(2-methyl-1-pyrrolidinyl)ethyl, Z is chloro situated in the 2-position, *m* and *p* have a value of zero, and *n* has a value of 1.

10. The dibenzo[c,g][1,2,5]thiadiazocine-5,5-dioxide in accordance with claim 1 wherein R is 2-(diisopropylamino)ethyl, Z is chloro situated in the 2-position, *m* and *p* have a value of zero, and *n* has a value of 1.

11. The dibenzo[c,g][1,2,5]thiadiazocine-5,5-dioxide hydrochloride salt in accordance with claim 1 wherein R is 2-(hexahydro-1H-azepin-1-yl)ethyl, Z is chloro situated in the 2-position, *m* and *p* have a value of zero, and *n* has a value of 1.

12. The dibenzo[c,g][1,2,5]thiadiazocine-5,5-dioxide hydrochloride salt in accordance with claim 1 wherein R is 2-(2,2,4-trimethyl-1-pyrrolidinyl)ethyl, Z is chloro situated in the 2-position, *m* and *p* have a value of zero, and *n* has a value of 1.

13. The dibenzo[c,g][1,2,5]thiadiazocine-5,5-dioxide hydrochloride salt in accordance with claim 1 wherein R is 2-piperidinoethyl, Z is chloro situated in the 2-position, *m* and *p* have a value of zero, and *n* has a value of 1.

14. The dibenzo[c,g][1,2,5]thiadiazocine-5,5-dioxide hydrochloride salt in accordance with claim 1 wherein R is 3-piperidinopropyl, Z is chloro situated in the 2-position, *m* and *p* have a value of zero, and *n* has a value of 1.

15. The dibenzo[c,g][1,2,5]thiadiazocine-5,5-dioxide in accordance with claim 1 wherein R is 3-(dimethylamino)propyl, Z is chloro situated in the 2-position, *m* and *p* have a value of zero, and *n* has a value of 1.

16. A method for producing a 6H-dibenzo[c,g][1,2,5]thiadiazocine-5,5-dioxide represented by the formula

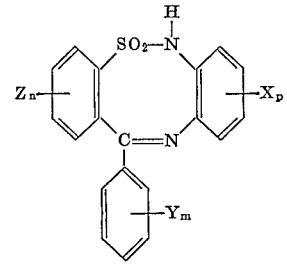

wherein X, Y, and Z are members of the group consisting of halo, trifluoromethyl, alkyl, and alkoxy; *m*, *n*, and *p* are integers having a value from 0 to 3, inclusive; and where the alkyl portions of the foregoing members contain no more than four carbon atoms; which comprises condensing, under reflux conditions in an aromatic solvent a 2-benzoylbenzenesulfonyl halide represented by the formula

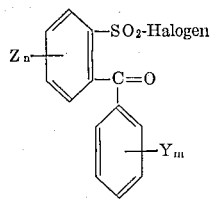

with an o-phenylene diamine represented by the formula

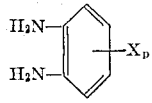

where X, Y, Z, $m$, $n$, and $p$ have the same meaning as above, and thereafter cyclodehydrating the obtained condensation product in an acid medium.

17. The method in accordance with claim 16 wherein the cyclodehydrated condensation product is further reacted with an organic halide in an aqueous solvent and in the presence of an alkali metal hydroxide.

References Cited

UNITED STATES PATENTS

| | | |
|---|---|---|
| 1,915,334 | 6/1933 | Salsberg et al. _____ 260—243 |
| 2,075,359 | 3/1937 | Salzberg et al. _____ 167—22 |
| 3,322,789 | 5/1967 | Kreighbaum. |

HENRY R. JILES, Primary Examiner

S. D. WINTERS, Assistant Examiner

U.S. Cl. X.R.

252—95, 187, 300; 260—326.5, 326.81, 327, 543, 556, 570, 999